United States Patent [19]

Bykhovsky et al.

[11] 4,213,027

[45] Jul. 15, 1980

[54] METHOD OF TREATING ELECTRODES INTENDED FOR OPERATION IN ARGON AS CATHODES OF AN ELECTRIC ARC

[75] Inventors: David G. Bykhovsky; Albert A. Voropaev, both of Leningrad, U.S.S.R.

[73] Assignee: Vsesojuzny Nauchno-Issledovatelsky Proektnokonstruktorsky I Tekhnologichesky Institut Elektrosvarochnogo Oborudovania, Leningrad, U.S.S.R.

[21] Appl. No.: 18,285

[22] Filed: Mar. 6, 1979

Related U.S. Application Data

[63] Continuation of Ser. No. 761,778, Jan. 24, 1977, abandoned.

[51] Int. Cl.² .............................................. B23K 9/06
[52] U.S. Cl. .................................... 219/75; 219/121 P; 219/137 R
[58] Field of Search .................................. 219/74, 75

[56] References Cited

U.S. PATENT DOCUMENTS

| 4,034,179 | 7/1977 | Koshiga et al. | 219/74 |
| 4,050,958 | 9/1977 | Shimada et al. | 219/75 |

*Primary Examiner*—Herbert T. Carter
*Attorney, Agent, or Firm*—Lackenbach, Lilling & Siegel

[57] ABSTRACT

A method of treating electrodes intended for operation in argon as electric arc cathodes. Each of the electrodes being treated consists of a holder with an active insert. The active insert comprises elements selected from the series of rare-earth elements, yttrium, alkali-earth elements, elements of Group IV A of the periodic system and compounds thereof, taken separately or in combination. The electrodes are treated in an electric arc burning in an atmosphere of argon and an active gas, such as nitrogen or oxygen. During the course of treatment the electrode functions as a cathode. A mixture of argon and oxygen or argon and nitrogen is fed to the cathode area of the arc. The duration of the electrode treatment cycle is at least 100 times less than that of the electrode operation time in an argon arc. Treatment is conducted by currents that do not exceed the maximum operating current values of the treated electrode. The volume concentration of the active gas in the mixture varies from 0.1 to 100%.

5 Claims, 3 Drawing Figures

METHOD OF TREATING ELECTRODES INTENDED FOR OPERATION IN ARGON AS CATHODES OF AN ELECTRIC ARC

This is a continuation, of application Ser. No. 761,778, filed Jan. 24, 1977 and now abandoned.

The present invention relates mainly to the field of arc and plasma treatment of metals, and more particularly, to a method of treating electrodes intended for operation in argon as electric arc cathodes. The invention can be used in plasma and electric-arc metallurgy, and employed in the cathodes of electron-beam devices.

Known in the prior art are electrodes for arc processes made of a tungsten rod with uniformly distributed alloying admixtures which reduce the work function of the electrodes. The alloying admixtures are for example lanthanum oxide, thorium oxide, yttrium oxide, and other compounds in various combinations. By varying the geometry of such electrodes (i.e., the diameter or the angle of backing-off) the upper limit can be increased or the lower limit reduced for the control of the current. However, the range of current control at which stabilization of the arc occurs remains comparatively narrow for all types of electrodes. The ratio between the lower limit of controlling the current and the upper limit within the entire range of control is at best 1 to 5 for said electrodes.

Also known in the prior art are electrodes for arc and plasma processes comprising a holder made from a high-melting material, wherein the working surface of the holder that is in contact with the arc, contains active substances such as barium oxide, zirconium nitride, yttrium oxide. For example, there is known an electrode consisting of a zirconium rod with a tip made from a mixture of zirconium and zirconium nitride (cf. U.S. Pat. No. 2,892,924, Cl. 219–118), or an electrode consisting of a tungsten holder with an active insert made from thorium oxide, cesium oxide, and zirconium oxide (cf. U.S. Pat. No. 2,922,028 to T. E. Butler, Cl. 219–145, Jan. 19, 1960).

These electrodes make it possible to lower the minimum value of the working current and improve stabilization of the arc within the range of the current control but the range of the working current control remains unchanged, and the ratio between the lower and the upper limits of the current control is on the order of 1 to 5.

All the above-mentioned electrodes suffer from one more substantial disadvantage.

When the current at which the arc is initiated is low, for example, 20 A, the arc is stable and located in space. When the current intensity increase, the stabilization of the arc and its spatial location with such electrodes is retained even at the maximum permissible values of the current. But at any lowering of the current the stabilization of the arc and its spatial location are disturbed.

This disturbance appears when the current is smoothly reduced from any great value to a lower one, as well as during the repeated striking of the arc at a lower value of the current.

In this case stabilization of the arc and its spatial location are disturbed.

For example, when a tungsten electrode with an active insert made from zirconium oxide is used (cf. U.S. Pat. No. 2,922,028, to T. E. Butler, Cl. 219–145, of Jan. 19, 1960) the maximum permissible value of the current is 500 A, whereas the stabilization of the arc and its spatial location are reached in the range of 20 to 100 A during both the increase and decrease of the working current.

One further disadvantage inherent in all the above-mentioned electrodes is a high cathode voltage drop.

It is an object of the present invention to eliminate the above disadvantages. The present invention relates to a method of treating electrodes. The object of the present invention is to develop a method of electrode treatment providing for a widening of the electrode operating current range, improvement in the arc stability in all spatial positions within the entire current control range, reduction in heat losses and a decrease in the cathode voltage drop.

While working to attain said objects the inventors discovered an unexpected effect which is graphically illustrated by the following examples.

1. An electrode known in the prior art was taken, consisting of a tungsten holder with an active insert of yttrium oxide, the diameter of the electrode being 4 mm. This electrode working as a cathode in an argon arc ensured a stabilization of the arc in space, with the working current lowered to a minimum value of 20 A.

This electrode was further treated for a short period in oxygen under the conditions of arcing of the electric arc. The unexpected effect discovered by the inventors was that after the above treatment the lower limit of the range of working current during operation as a cathode in argon dropped a hundred-fold to 0.2 A, and the cathode voltage drop substantially decreased in the entire range of current.

2. An electrode known in the prior art which consisted of a 4 mm diameter zirconium holder with an active insert of zirconium nitride, was tested as the cathode of an argon arc.

The tests showed that this electrode operated in a range of current not exceeding 300 A and did not ensure the stabilization of arc in all the positions in space within the entire range of current control.

The electrode was further treated in an arc containing nitrogen.

The unexpected effect was that after treatment in an arc in the atmosphere of nitrogen, the cathode with an active insert of zirconium nitride began operating in argon in the range of working current from 50 to 500 A. The stabilization of the arc was preserved during multiple variations in the working current in both directions—from 50 to 500 A and from 500 to 50 A.

3. After arc treatment in nitrogen of a cathode, consisting of a 4 mm diameter hafnium holder with an active insert of cerium oxide, the upper limit of the range of working current increased to 700 A, heat losses in the electrode considerably decreased and stabilization of the arc improved.

At the same time the maximum permissible magnitude of the current at the hafnium cathode with an active insert of cerium oxide without treatment in nitrogen was 5 times lower.

The unexpected effect was that the treatment of the hafnium cathode with an active insert of cerium oxide in a nitrogen arc imparted new properties to the electrode.

It was established that arc treatment in oxygen of cathodes, containing oxides of different elements on the working surface, and treatment in nitrogen of cathodes, containing nitrides on the working surface, as well as arc treatment both in nitrogen and oxygen of cathodes, containing oxides or nitrides on the active surfaces, result in a considerable increase in the emission activity, decrease in the work function of electrons and localization of the cathode spot. This makes it possible to considerably expand the range of working current, reduce the heat losses in the electrode and the cathode voltage drop.

The unexpected effect discovered by the inventors served as a basis for developing a method of treating electrodes which ensured the attainment of these objects.

This is attained by the proposed method of treating electrodes intended for operation in argon as the cathodes of an electric arc, wherein the active working surface of the electrodes that contacts the arc, incorporates elements selected from a series of rare-earth metals, yttrium, alkali-earth elements, elements of Group IV A of the periodic system and compounds thereof, taken both separately and in combination. According to the invention, the treatment of the electrodes is carried out under conditions of arcing of the electric arc so that the electrode being treated functions as a cathode. A mixture of argon with an active gas is fed to the cathode area of the arc which, together with at least one of said elements, namely, rare-earth metals, yttrium, alkali-earth elements, elements of Group IV A and compounds thereof, taken both separately and in combination, forms compounds whose work function is not more than three electronvolts, and the electrode is treated for a period which is at least 100 times less than the period of operation of the electrode in argon, with the current not exceeding the upper limit of the range of working current, the volumetric concentration of the active gas in the mixture being from 0.1 to 100%.

It is advisable to use oxygen as an active gas.

Alternatively, nitrogen can be used as an active gas.

It is also advisable to add periodically to the cathode area of the arc an active gas for continuous operation of the electrode in argon, and the repeated addition of active gas to argon should be carried out for a period which is at least 100 times less than the period of operation of the electrode in argon.

The treatment of cathodes whose active working surfaces contain the elements from a series of rare-earth metals, yttrium, alkali-earth elements and elements of Group IV A of the periodic system, in active gas ensures an increase in the emission activity, a decrease in the work function of the electrons and the localization of the cathode spot, which results in an expansion of the range of working current and a reduction of heat flow to the electrode. At the same time a considerable reduction of the cathode voltage drop is ensured.

A great advantage of cathodes which have been treated in an active gas is an improvement in the stabilization of the arc and its spatial location in the entire range of the working current control.

In addition, the cathodes treated according to said method have a longer service life in an argon arc as compared with untreated cathodes.

The invention is further illustrated by a version of its embodiment to be taken with reference to the accompanying drawings, wherein.

The treatment of electrodes intended for operation in argon as the cathodes of an electric arc is carried out in an active gas. The cathodes active working surfaces that contact the arc, contain elements selected from a series of rare-earth metals, yttrium, alkali-earth elements, elements of Group IV A of the periodic system and compounds thereof, taken both separately and in combination. The treatment is carried out under conditions of arcing of the electric arc so that the electrode being treated functions as a cathode. A mixture of argon is fed to the cathode area of the arc with an active gas which, together with one of the rare-earth metals, yttrium, alkali-earth elements, elements of Group IV A of the periodic system and compounds thereof, taken both separately and in combination, forms a compound having a work function of not more than three electronvolts. The period of treatment of the electrode should be at least 100 times less than the period of operation of the electrode as the cathode of an arc in argon. The electrodes are treated with currents not exceeding the upper limit of the range of working currents, with the volumetric concentration of the active gas in the mixture being from 0.1 to 100%.

The method of treating electrodes resides in the following.

Figure 1:
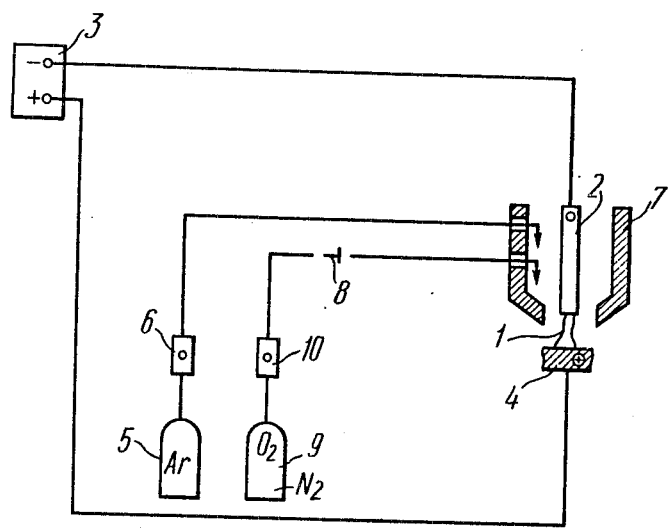
FIG. 1 shows an apparatus for treating electrodes in an active gas, according to the invention.

An electric arc 1 (FIG. 1) is excited in argon between an electrode 2 being treated, connected to the negative pole of a supply source 3 and an anode 4 connected to the positive pole. The current of the arc is established to be not higher than the maximum working current.

A controlled amount of argon is supplied from a cylinder 5 via a flowmeter 6 and enters the arc 1 through a nozzle 7. Then a valve 8 opens and an active gas which together with argon is supplied to the near-the-cathode area of the arc 1 also through the nozzle 7 is fed from a cylinder 9 through a flowmeter 10. The volumetric concentration of the active gas in the mixture with argon is established to range from 0.1 to 100%. The active gas entering the near-the-cathode area of the arc forms, together with one of the elements located on the active working surface of the cathode in the place of contact with the arc, a compound with a work function of not more than three electron-volts. After a period which is at least 100 times less than the period of operation of the electrode in argon, the valve 8 closes. Thereafter, the supply source 3 is cut off, the arc 1 is extinguished and the supply of argon is stopped. The electrode 2 has thus passed the treatment and is ready for use as a cathode of arc and plasma devices.

It is preferable to use nitrogen as an active gas during treatment of electrodes intended for operation as cathodes in argon at high currents (over 500 A).

It is advisable to use oxygen as an active gas in treatment of electrodes intended for operation in argon at low currents (from 0.1 A).

The periodic treatment of electrodes in the process of continuous operation in an argon arc is carried out in the following manner. An electrode treated in an active gas and ready for operation is taken, an arc is excited in argon and the technological process is conducted in argon for a required period. Then, without interrupting the process, fed to the near-the-cathode area of the arc is a small amount of an active gas (not less than 0.1%) together with argon, for a short period (at least 100 times less than the period of the technological process). Then the supply of the active gas is stopped and the process goes on in argon. The repeated supply of the active gas is carried out in a similar manner.

To illustrate the method of treating electrodes in an active gas, several examples are given.

EXAMPLE 1

Figure 2:
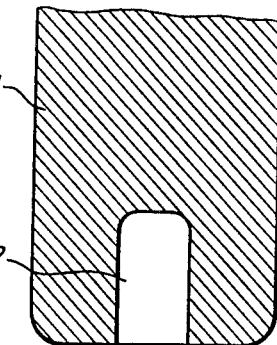
FIG. 2 is an electrode intended for operation in argon and functioning as a cathode when it is treated in an active gas.

An electrode was taken, consisting of a tungsten rod 11 (FIG. 2) having a diameter of 4 mm and a length of 45 mm, and an active insert 12 which was a blind cylindrical hole in the tungsten rod having a depth of 4 mm and a diameter of 1.5 mm and filled with cerium oxide.

The preliminary treatment of the electrode in the arc containing oxygen was carried out in the following manner. The treatment was conducted under the conditions arcing of the electric arc, according to FIG. 1, so that the electrode being treated was functioning as a cathode. The arc 1 was excited from the supply source 3 with a current of 50 A in argon whose consumption was 0.3 g/sec. In 10 seconds when the active insert 12 (FIG. 2) was sufficiently hot, oxygen was fed (a 10% addition of oxygen to argon) for one second. In one second the supply of oxygen was stopped.

After treatment with oxygen this electrode underwent tests in an arc in argon for 8 hours. The tests showed that this electrode ensured the stabilization of the arc and its spatial location during operation in argon in the range of from 5 to 200 A; the working current could be varied in both directions.

Multiple striking and extinguishing of the arc at currents of from 5 to 200 A also showed that the electrode operated in argon under conditions of steady stabilization of the arc.

EXAMPLE 2

A cylindrical rod electrode from titanium with a diameter of 4 mm and an active insert from semarium oxide was made. Samarium oxide was pressed into a blind hole in the end face of the electrode with a depth of the hole being 4 mm and a diameter of 1.5 mm.

The electrode was treated in an arc containing nitrogen. For this purpose the electrode 2 (FIG. 1) was connected to the negative pole of the supply source 3. The arc 1 was excited for 5 seconds on the electrode with a current of 20 A in a mixture of argon and nitrogen. The argon consumption was 0.3 g/sec, and the volumetric concentration of nitrogen in the mixture was 20%.

Thereafter, the nitrogen supply was stopped. The electrode was tested in argon. The maximum permissible current magnitude at the electrode was 300 A. The test of the electrode in argon was carried out under the following conditions; first the arc was excited with a current of 20 A, then the current intensity was smoothly increased to a certain magnitude and the arc was extinguished. The next excitation was also done at 20 amps. The current was adjusted from 20 to 300 A in 20 A increments with the subsequent extinguishing of the arc, i.e., the arc was extinguished at currents of 20, 40, 60, . . . 300 A. The two-hour test showed that the electrode was working in argon under conditions of steady stabilization of the arc in the range of the current control in both directions from 40 to 300 A.

EXAMPLE 3

The electrode consisted of a tungsten holder with a diameter of 4 mm and a length of 30 mm with an active insert which was a blind hole in the end face of the tungsten rod with a depth of 4 mm and a diameter of 1.5 mm filled with an yttrium oxide. The electrode 2 (FIG. 1) was connected to the negative pole of the supply source 3, and an arc was excited on the electrode in argon with a current intensity of 5 A for 10 seconds. In 10 seconds oxygen was supplied and the volumetric concentration of oxygen in the mixture was 0.1%. The treatment in the mixture of argon with oxygen was conducted in an arc for 30 seconds, then the oxygen supply was cut off. The tests carried out in argon showed that the electrode ensured the stabilization of the arc when the current was reduced to 0.2 A. The maximum exciting current of the arc was 0.3 A. The cathode voltage drop in the entire range of currents was considerably reduced.

The tests of the cathode which had been treated in an arc, containing oxygen were carried out together with the initial cathode which had not been pre-treated. At the same time tests were conducted of cathodes from thoriated tungsten for microplasma Secheron burners and cathodes from yttriated and lanthanated tungsten. The rod cathodes from thoriated, lanthanated and yttriated tungsten with a diameter of 2.5 mm were taperturned at an angle of 20° to 30°.

In the process of testing the range of working currents, the minimum exciting current of the arc and voltage-current characteristics were determined.

The tests showed the following: the minimum exciting current of the arc on a tungsten electrode with an insert from yttrium oxide was 5 amps, on thoriated tungsten (Secheron) 3 A, and on lanthanated and yttriated tungsten 3 A.

But the minimum exciting current of the arc on a tungsten electrode with an insert from yttrium oxide which had been treated in oxygen was 0.3 A.

The stabilization of the arc and its spatial location on electrodes from thoriated (Secheron), lanthanated and yttriated tungsten were disturbed when the current was reduced to 1.8 A, whereas there was no disturbance of the stabilization of the arc on the electrode treated by said method when the current was reduced to 0.2 A.

Figure 3:
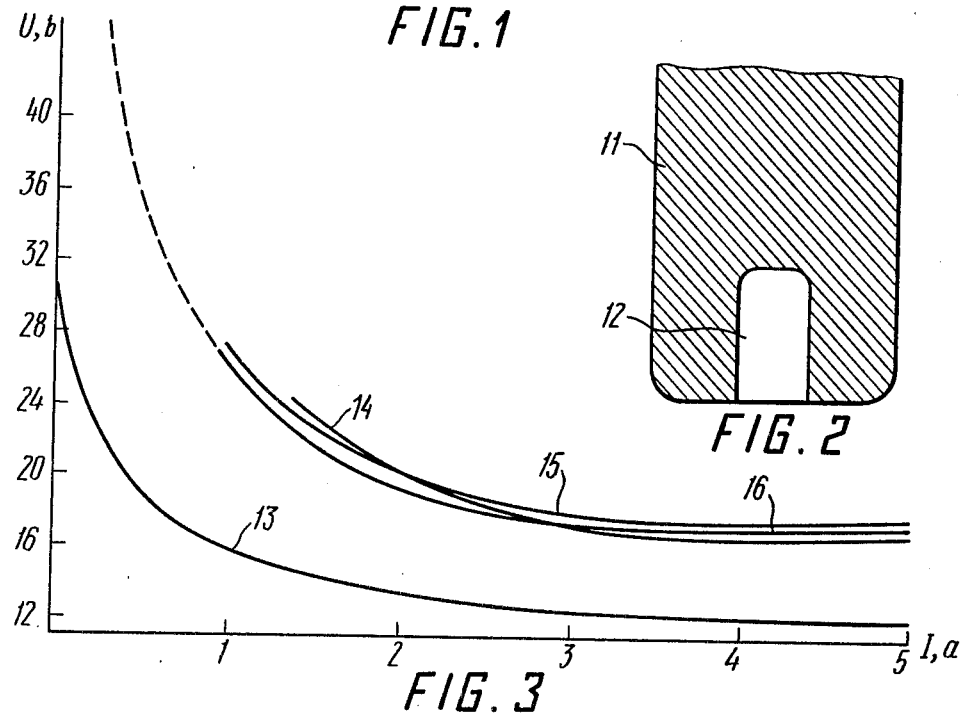
FIG. 3 shows comparative current-voltage characteristics of an electrode treated according to said method and of electrodes known in the art.

The comparative voltage-current characteristics of all the electrodes which had undergone testing are shown in FIG. 3, wherein on the Y-axis there are shown the values of voltage drops in the arc in volts, and on the X-axis there are shown intensity of the current in amperes. The voltage-current characteristics 13 of the electrode which had been treated in oxygen was considerably lower than those of electrodes from thoriated tungsten 14 (Secheron), lanthanated tungsten 15 and yttriated tungsten 16. The voltage drop on the arc for a cathode treated in an oxygen arc with low current was twice as low as for the cathodes known in the art, a feature of substantial importance in designing supply sources.

EXAMPLE 4

The present example illustrates a method of periodic treatment of an electrode during its continuous operation in an arc in argon in the process of welding copper with a normal polarity. The electrode was a tungsten rod with a diameter of 4 mm and a length of 45 mm. In the end face of the tungsten rod there was drilled a blind hole into which an insert from hafnium was pressed with a diameter of 1.5 mm and a length of 5 mm.

The arc was excited in argon on an extendable strip. During the burning of the arc on the extendable strip with a current of 200 A a mixture of argon with nitrogen (20% of nitrogen) was fed to the cathode area for 5 to 8 seconds. When the arc approached the beginning of the working section of the weld, the supply of nitrogen was stopped, the current was increased to 1,000 A and the welding was conducted in argon. After passing the weld and the exit of the arc onto the extendable strip, the current was again reduced to 200 A and 20% of nitrogen was again fed for 5 to 8 seconds. The addition of 20% of nitrogen when the arc was on the extendable strip and the cathode was moving from one welded joint to another (5 to 8 seconds) ensured a reliable operation of the electrode in argon and a strict localization of the arc during passing the weld.

The method of periodic treatment ensured a 20 fold reserve of the time of fitness of the electrode for operation in argon. After 10 hours of operation the electrode had no noticeable destruction and ensured a reliable operation with currents from 1,000 to ,1200 A.

What is claimed is:

1. A method for treating electrodes operating in argon as electric arc cathodes in a welding process wherein said electrodes comprise a holder with an active insert made of a substance selected from the group consisting of elements of rare-earth metals, yttrium, alkali earth-metals, elements of Group IV A of the Periodic System, and compounds thereof, separately and in combination; the method comprising contacting the cathode area of the arc with a mixture of argon and an active gas selected from the group consisting of nitrogen or oxygen, for a period of time lasting at least 100 times less than that of the period of operation of the electrode in argon alone, with the current not exceeding the upper limit of the working current range, and the volumetric concentration of said active gas in the mixture varying from 0.1 to 100 percent.

2. A method as claimed in claim 1, wherein the active gas is oxygen.

3. A method as claimed in claim 2, wherein operation of the electrode occurs continuously, and the active gas is periodically added to the cathode area of the arc, for a period of time which is at least 100 times less than the period of operation of the electrode in argon.

4. A method as claimed in claim 1, wherein the active gas is nitrogen.

5. A method as claimed in claim 4, wherein operation of the electrode occurs continuously, and the active gas is periodically added to the cathode area of the arc, for a period of time which is at least 100 times less than the period of operation of the electrode in argon.

* * * * *